United States Patent [19]

Adler

[11] Patent Number: 4,859,157
[45] Date of Patent: Aug. 22, 1989

[54] DEVICE FOR INJECTING FERTILIZER OR OTHER CHEMICALS INTO A PIPELINE

[76] Inventor: Dan Adler, 56 Haag Street, Haifa, Israel

[21] Appl. No.: 269,677

[22] Filed: Nov. 10, 1988

[30] Foreign Application Priority Data

Dec. 31, 1987 [IL] Israel ......................................... 84994

[51] Int. Cl.⁴ ............................................. F04D 13/04
[52] U.S. Cl. ...................... 417/348; 415/84; 417/406; 137/99; 239/310
[58] Field of Search ............... 415/143, 121 R, 78, 415/83, 84; 417/348, 405, 406; 137/99; 239/10, 310

[56] References Cited

U.S. PATENT DOCUMENTS

| | | | |
|---|---|---|---|
| 2,701,682 | 2/1955 | Dallenbach et al. | 417/406 |
| 3,101,090 | 8/1963 | Carden | 137/99 |
| 3,425,435 | 2/1969 | Garabello | 137/99 |
| 3,549,048 | 12/1970 | Goodman | 137/99 |
| 3,570,508 | 3/1971 | Boggs et al. | 137/99 |
| 4,008,983 | 2/1977 | Flatt et al. | 417/348 |
| 4,651,765 | 3/1987 | Beth | 137/99 |

*Primary Examiner*—Robert E. Garrett
*Assistant Examiner*—M. V. Readey
*Attorney, Agent, or Firm*—Frishauf, Holtz, Goodman & Woodward

[57] ABSTRACT

A device for injection of liquid fertilizer into an irrigation pipe includes an axisymmetrical housing (I) adapted for insertion into the pipe line (III). The device comprises an axial turbine impeller (II) rotatably positioned in the housing, the impeller including several vanes (20) surrounded by a shroud (22) and a flat, annular rim (6) outstanding from the shroud and closely surrounded by the housing walls. The rim contains, on one or on both of its flat sides, a side-channel pump of known design which includes a plurality of radial vanes (30) inserted into an annular portion of the flat side and a channel (33) recessed in the adjoining housing wall portion cooperating with the annular vane portion and extending from an inlet end (34) to an outlet end (35), the two ends being separated by a non-recessed wall portion (36). Liquid fertilizer is caused to enter the inlet end through an inlet port in the housing, is pressurized by the movement of the vanes along the channel and leaves the outlet end through an outlet port in the housing, from where it is conveyed to the irrigation pipe at a point (19) downstream of the pump impeller.

12 Claims, 6 Drawing Sheets

DEVICE FOR INJECTING FERTILIZER OR OTHER CHEMICALS INTO A PIPELINE

BACKGROUND OF THE INVENTION

The invention relates to a system for injecting a liquid into a pipe carrying water or another liquid at a predetermined rate of flow in proportion to the flow in the pipe. It relates particularly to a system adapted to inject liquid fertilizer into a pipe line carrying water for the irrigation of fields.

In addition to pumps driven by an external power source, serving to inject fertilizer into a water supply line, different devices are known wherein a small pressure drop in the line is utilized for this purpose. Among these devices are Venturi-type and double-Venturi type injectors, their main drawback being the difficulty of exact dimensioning the addition of liquid fertilizer which should be proportional to the irrigation water flow through the supply line.

Other known systems for injecting liquid fertilizer into a pipe carrying irrigation water comprise a turbine impeller driven by the irrigation water and itself driving a pump which draws fertilizer out of a container and pumps it into the pipe line, usually at a location downstream of the turbine.

Such a system is described in U.S. Pat. No. 3,570,508 (BOGS) which comprises an axial turbine impeller coaxially positioned in the pipe and a pump in the form of a helical rotor rotating within a flexible stator housing. Valve means are provided for controlling the fertilizer flow.

The main drawback of this system is the low efficiency of the helical pump, more particularly its enclosure in a flexible stator housing causing considerable friction losses.

Another known embodiment of a fertilizer injector comprises a tangential turbine and a pump mounted on a common shaft in a casing positioned outside an irrigation pipe. The turbine is driven by a measured flow of water drawn from the pipe and spilled into the open after having passed the turbine. The pump draws fertilizer out of a container and injects it into the pipe downstream of the port delivering water to the turbine. Two kinds are proposed as alternatives: (1) a spiral-type screw conveyor, (2) a centrifugal impeller, both kinds of pumps being enclosed in a casing which communicates at its low-pressure side with a fertilizer container, and at its high-pressure side with the irrigation pipe. This system suffers from the drawback that the used water is spilled into the open, and that the pump impeller is necessarily of low efficiency.

Another embodiment of a fertilizer injection system comprises an axial-flow turbine impeller coaxially positioned in the irrigation pipe, a gear pump positioned outside the pipe on a mounting plate, and a gear train extending between turbine and gear pump. Again, as in the aforementioned systems, the pump injects liquid fertilizer into the pipe carrying the irrigation water. The main drawback of this embodiment is the requirement of bevel gearing for transmission of power from turbine to pump, which is usually a source of trouble, especially as the gear is submerged in the water in the pipe and is not readily accessible.

All the aforementioned systems comprise a pump sealingly separated and distanced from the turbine, thus requiring a power transmission in the form of a shaft or a gear train. Both the pump and the transmission absorb power by friction in the bearings and in the fluid seals, considerably reducing the power output of the turbine, which should be small in any case in order not to cause a large pressure drop in the irrigation pipe.

SUMMARY OF THE INVENTION

The present invention has as its main object the avoidance of the above drawbacks; it seeks to provide an automatic fertilizer injection device of very simple design and of high efficiency.

It is a second object to provide a pump which is integral with the turbine impeller and which should require neither separate bearings nor power transmission means.

And it is still another object to provide a fertilizer injection device at low cost, which should be easy to install and to remove, if necessary.

According to a broad aspect of the present invention a liquid fertilizer injection device to be energized by the water flow in an irrigation pipe comprises: an axisymmetrical housing adapted for insertion in, or connection to an irrigation pipe line and containing an impeller rotatable in axial alignment therewith, wherein the impeller includes, a hub rotatable in bearings positioned in a central portion of the housing, a turbine portion comprising vanes extending from the hub periphery and adapted to rotate the impeller by the impulse of the water flow, a pump portion in the shape of a substantially flat rim radially extending from the turbine portion and provided along an annular lateral portion with a plurality of radial, spaced-apart vanes, and wherein the housing comprises, a tubular portion surrounding the turbine portion of the impeller including a central portion serving to support the impeller hub, a peripheral portion enclosing the pump portion of the impeller at a small clearance, the peripheral housing wall being recessed in the form of a channel facing the annular lateral portion of the rim containing the vanes and extending between a suction port which communicates with a source of liquid fertilizer, and a discharge port which communicates with the housing portion carrying the irrigation water.

The pump portion is of the kind known as turbine pump or side-channel pump which works on the principle that the liquid travels along the stationary channel between suction and discharge port while entering the spaces between the moving vanes of the impeller, each of which imparts impulse energy to the liquid, the total pressure energy being a summation of that received from the number of vanes which were contacted by the liquid on its travel along the channel with a view to obtaining maximum pressure rise. The length of the channel is advantageously almost a full circle, the suction and discharge ports being positioned close to each other, while the housing wall portion between the two ports is not recessed, but adheres closely to the vanes portion.

In a preferred embodiment the pump portion vanes are provided on both opposite sides of the rim and are enclosed by a common channel, similarly extending between the respective suction and discharge ports.

In order to increase the pressure, the rim may contain a set of vanes on each of its opposite sides, respectively faced by a channel each recessed in the housing wall. One of the channels extends from a suction port to a duct communicating it with the low-pressure end of the opposite channel, the latter terminating at a discharge port. By means of this arrangement the pressure can be increased to almost twice the pressure obtainable by a single set of vanes faced by a single channel.

Or, alternatively, two parallel sets of vanes, each faced by a channel recessed in the housing wall, may be provided on one of the two sides of the flat rim. These may serve either to increase the pressure by pumping the liquid from the discharge port of one of the vane sets into the inlet port of the other set, or they may not be interconnected for independently pumping two different liquids into the irrigation pipe It is also proposed to arrange more than two sets of vanes on one or on both sides of the flat rim for either attaining higher pressure or for conveying more than one liquid, or for both purposes simultaneously.

The turbine vanes are preferably surrounded by a shroud which is integral with the impeller and separates the turbine portion from the pump portion. In order to obtain complete separation of the two portions, annular seals are preferably installed between the rotating shroud and the stationary housing wall.

SHORT DESCRIPTION OF THE DRAWINGS

FIG. 1 is a longitudinal section through a liquid-injection device comprising a radial and mixed-flow turbine portion and a single side-channel turbine pumping portion, FIG. 2 is an isometric view and section through the pumping portion shown in FIG. 1, FIG. 3 is an isometric view of a pumping portion similar to that shown in FIG. 2, but provided with two parallel sets of vanes on one side of the flat rim, FIG. 4 is a cross section through the device of FIG. 1 in the direction of the arrows A—A, presenting an elevation of the pumping vanes, FIG. 5 is the cross section of FIG. 4, but in the direction of arrows B—B, presenting an elevation of the side channel, FIG. 6 is a similar elevation of the side channel as shown in FIG. 5, but in the form of two shorter channels, each provided with a suction and a discharge port, FIG. 7 is a longitudinal section through another embodiment of the liquid-injection device, comprising an axial turbine portion and a two-stage side-channel turbine pumping portion, comprising vanes on both sides of the flat rim, FIG. 8 is a longitudinal section through still another embodiment of the invention comprising an axial turbine portion and a double-sided open-channel turbine pumping portion, FIG. 9 is a view of a portion of the pump-impeller vanes, of the kind illustrated in FIG. 8, and FIG. 10 is a diagrammatic elevation of an injection control system.

DETAILED DESCRIPTION OF THE DRAWINGS

Figure 1:
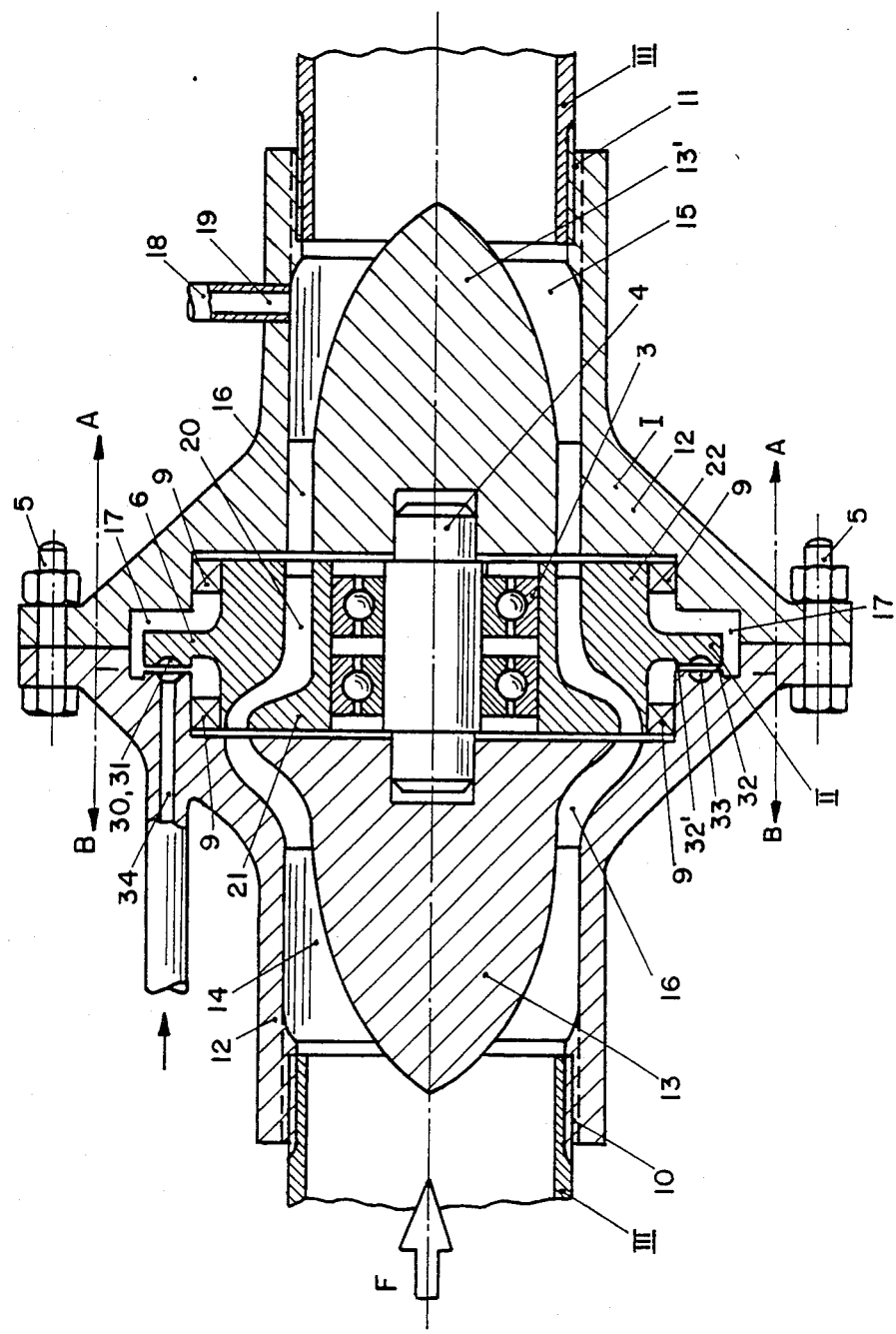
Figure 4:
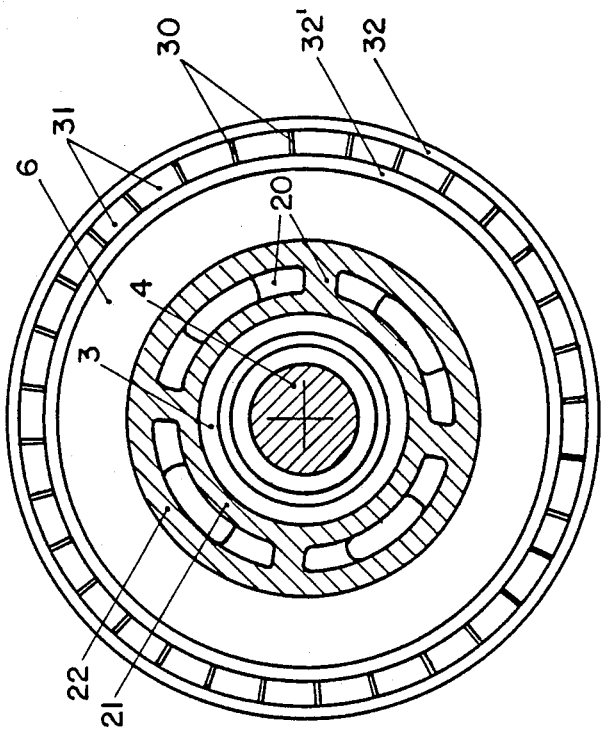
Figure 2:
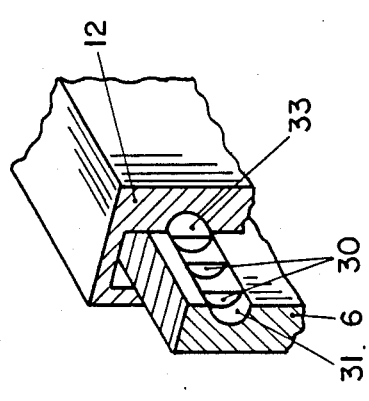

With reference to FIGS. 1, 2, 4 and 5, a liquid-injection device comprises a housing I and an impeller II rotatably positioned in the housing. The impeller II includes a turbine portion essentially defined by a number of curved turbine vanes 20 and a pumping portion defined by radial vanes 30 separated by semicircular recesses 31. The impeller comprises a hub 21 which is rotatably carried by two ball bearings 3 which, in their turn, are mounted on a horizontal axle 4. The hub 21 forms the inner border of the vanes 20 and their channel, while a shroud 22 forms the outer border thereof and separates the pumping portion from the turbine portion by close adherence to the housing contours. The turbine vanes in this embodiment define a radial and mixed flow, but it will be seen that other embodiments of the invention are provided with axial-flow turbine vanes. The pumping portion is essentially in the shape of a flat, circumferential rim 6 extending from the shroud 22, one side of which contains the aforementioned radial vanes 30 which are evenly spaced in circular alignment and can be readily machined by means of a milling operation by cutting recessed spaces 31 between each two vanes into the rim's surface.

The housing I has an inlet opening 10 and an outlet opening 11, both provided with inner screw-thread for connection to a pipe line III. The housing is assembled from two halves and connected by bolts 5 permitting insertion and assembly of the components. It includes a turbine portion consisting of a tubular casing 12 and two central guides 13 and 13' each tapering towards the respective housing inlet and outlet openings. They are separated by a space of a width suitable for accommodation of the impeller hub and contain coaxial bores holding the axle 4. The guides are held in the casing by radial ribs 16 and define—together with the casing 12—an annular inlet duct 14 and an annular outlet duct 15, cooperating with the respective inlet and outlet ends of the impeller vanes 20. The housing further includes a peripheral pumping portion which comprises an annular space 17 enclosing the rim 6, while being separated from the rim surface containing the vanes 30 by a narrow gap 32 and 32'. This gap should be in the vicinity of 0.1 mm for small-impeller devices, but may be larger in the case of larger devices. A channel 33 is recessed in the housing wall opposite the vane portion and extends along almost a full circle, between a suction port 34 and a discharge port 35. The two ports are positioned close to each other in order to effect a sufficiently long pumping space, and the wall area 36 between the two ports is not recessed, but is separated from the impeller surface by the same small gaps 32 and 32'. The suction port 34 is connected to a container filled with fertilizer or any other liquid material to be added, while the discharge port 35 communicates with the housing I by means of a tube 18 connected to an opening 19 in the casing wall 12, or is connected to a by-pass valve as appearing in FIG. 10.

The turbine portion is separated from the pump portion by means of two seals 9 and 9', inserted between the shroud 22 and the housing wall, but such seals may be omitted in case a very narrow clearance between impeller and housing can be maintained.

The water flowing through the housing in the direction of the arrow F impinges on the vanes 20 and rotates the impeller. The vanes 30 of the pumping portion drive the fertilizer (or any other liquid) along the channel 33 from the suction port 34 to the discharge port 35, where-by each vane imparts an additional energy impulse to the liquid, thereby increasing its pressure towards the discharge port. In case the fertilizer container is at a higher level than the device, liquid enters the channel by gravity, but the pump is also capable of generating a suction head which will serve to draw liquid out of a lower-positioned vessel. The liquid leaves the channel through the discharge port 35 from where it is piped into the housing through the tube 18 and the opening 19, mixing with the water in the correct proportion, or is delivered to a control station as, for instance, illustrated in FIG. 10.

Figure 10:
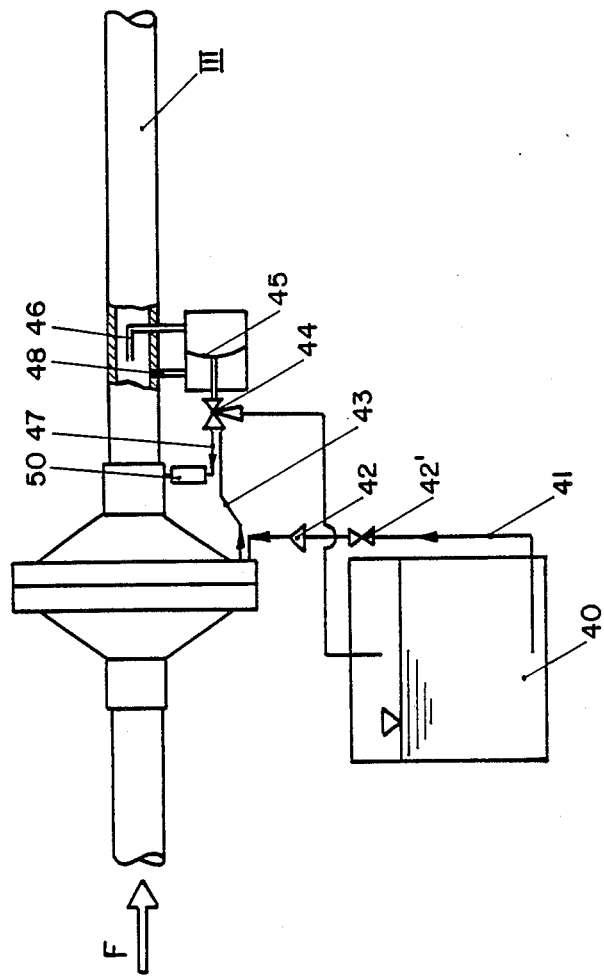

FIG. 10 illustrates, in diagrammatical fashion, the means for controlling the supply of fertilizer to irrigation water: Herein a container 40 supplies fertilizer to the device by means of a pipe 41, a check valve 42 and a needle valve 42', the fertilizer entering the channel 33 through the suction port 34. The pressurized liquid leaves the device through a pipe 43 and enters a by-pass valve 44 which—in accordance with the flow velocity or flow rate in the pipe III—injects a predetermined percentage of fertilizer into the water through pipe 47 and a flowmeter 50, while the remainder is returned to the container. In its simplest embodiment the by-pass valve is a sliding-spool valve controlled by a diaphragm 45 located in a housing. The near side of the housing communicates with the pipe III via a connection 48 transmitting the static pressure in the flow, while the far side is connected to a total pressure probe 46 in the center of the pipe. The total pressure transmitted to the far side urges the diaphragm to the left of the drawing—against the static line pressure—and shifts the by-pass valve so as to effect an increased supply of fertilizer in proportion to the increased flow rate in the pipe III. At zero-flow rate the by-pass valve 44 is completely closed in order to prevent leakage of water from pipe III into the fertilizer container 40. This is also the purpose of check-valve 42.

Here it is pointed out that the side-channel turbine pumps require a maximum of driving power at a minimum delivery, and for this reason the pump should be designed for operation at a more-or-less constant delivery in the region of its high efficiency. This pump feature will, therefore, not permit delivery control by throttling.

Figure 7:
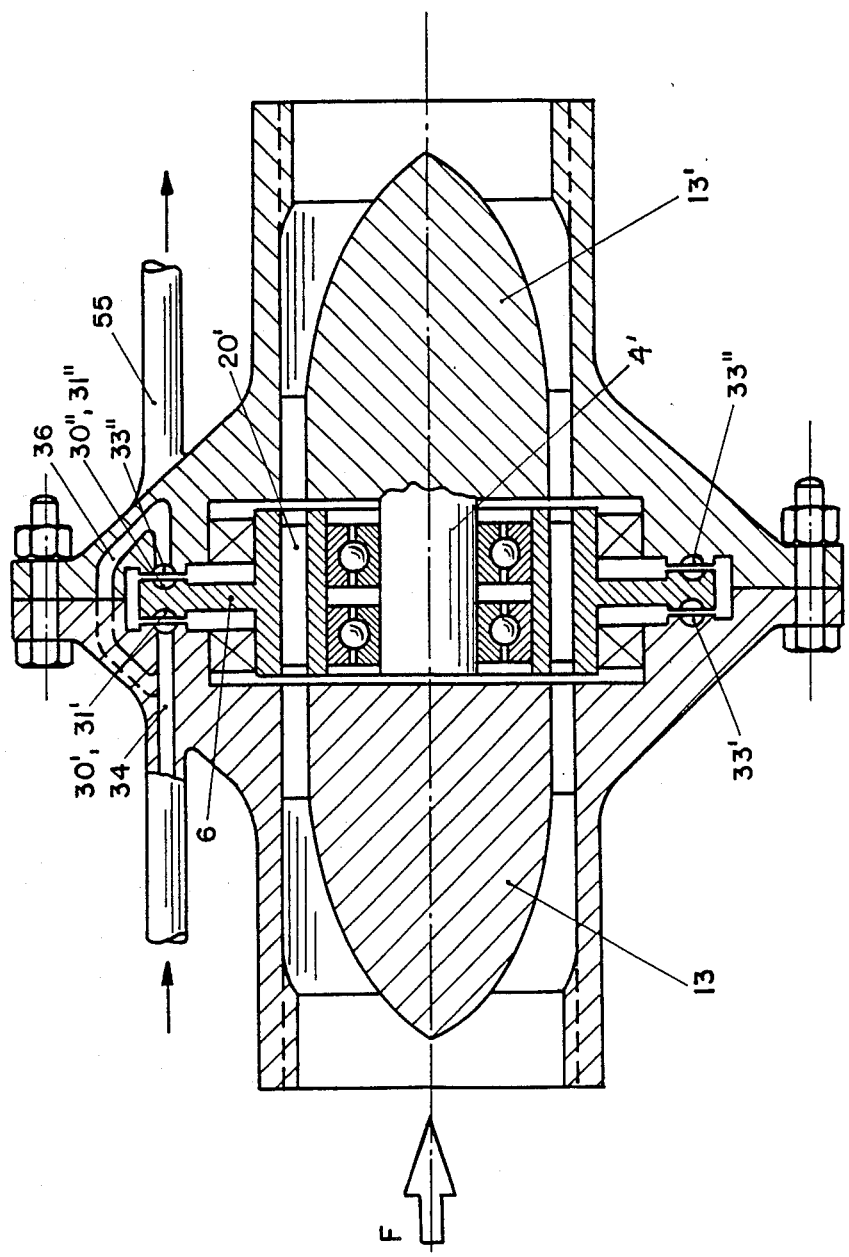

The injection device illustrated in FIG. 7 is in most parts identical with that of FIG. 1, with the exception that it is designed for a higher pump delivery head. The higher head is attained by means of a two-stage side-channel turbine pump, which comprises vanes 30', intermediate recesses 31' and a corresponding channel 33' on one face of the rim 6, and vanes 30", recesses 31" and a channel 33" on the opposite face. The channel 33' extends from the suction port 34 to a discharge port and duct 36 which connects it to the suction end of the opposite channel 33". This channel terminates at a final discharge port and pipe 55 which conveys the liquid to a control station. The present embodiment also differs from that illustrated in FIG. 1 by the provision of an axle 4' as an integral part of the tapered guide 13', serving to support the impeller. Evidently, the axle 4' may likewise be an integral part of the guide 13, the advantage of this arrangement being the possibility of maintaining small clearances, while facilitating the assembly of the various components.

The turbine in the present case consists of axially disposed vanes 20', which makes for a simpler design of the housing and the impeller. Those components which are identical with, or similar to the components of the first described embodiment, have not been specially marked by numerals, since their action and performance has already been described with regard to FIGS. 1, 2, 4 and 5. It is evident that by conveying the liquid through a two-stage pump, the pressure obtained in the discharge pipe 35 will be higher than that received by the device illustrated in FIG. 1, at the same peripheral or tangential speed. Since the delivery head necessary for injection of the fertilizer into the irrigation water is to be slightly higher than the line pressure, the necessary peripheral speed can be readily calculated, and it becomes evident that an impeller provided with a two-stage pump (FIG. 7), can rotate at a lower speed than that containing a single-stage pump (FIG. 1), and that the turbine vanes are to be designed accordingly. It should also be noted that lower revolutions of the impeller result in lower friction losses, both mechanical and hydraulical, which would favor the two-stage design of the injection device.

Alternatively the two-stage pump could be designed to a smaller diameter, while attaining the same desired pressure size. This design would not only effect a smaller housing—with resulting cost reduction—but will cause lower friction losses.

Figure 3:
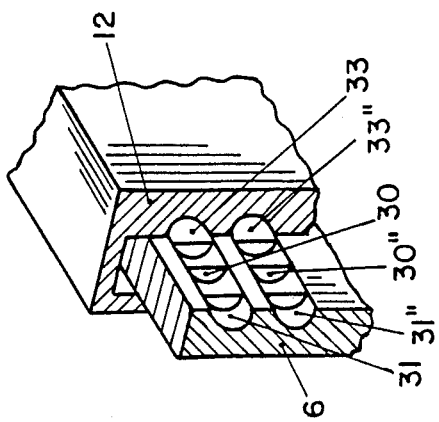

Another embodiment of a two-stage pump is illustrated in FIG. 3: herein only one side of the flat rim 6 is provided with two sets of side-channel turbine vanes 30 and 30", while corresponding channels 33 and 33" are recessed in the adjoining casing wall. The channels may either communicate so as to form a two-stage pump, or they may be unconnected so as to operate independently. In the latter case it is possible to pump two different kinds of liquids or chemicals and to inject them in mixed state into the pipe III.

Figure 8:
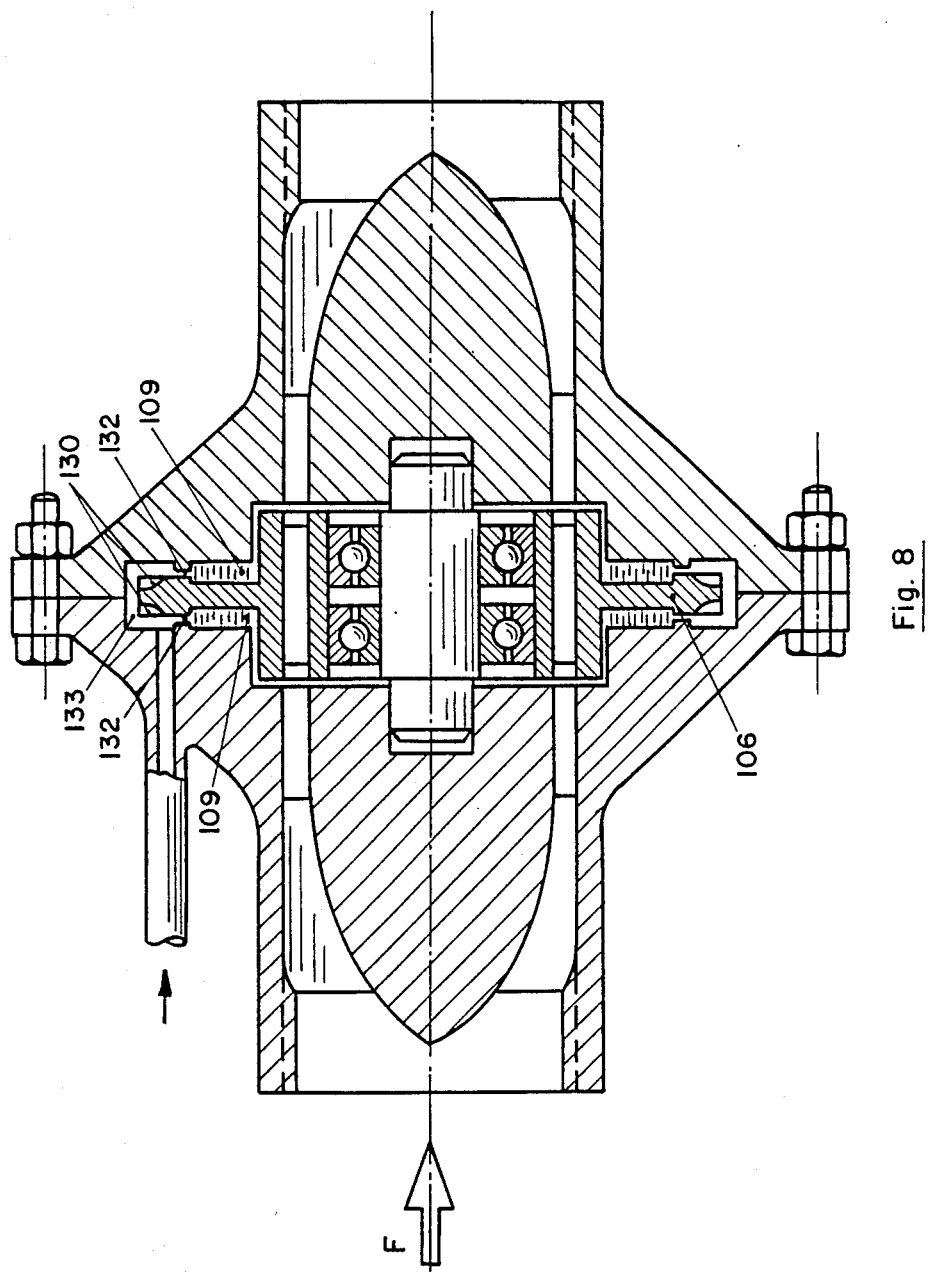
Figure 9:
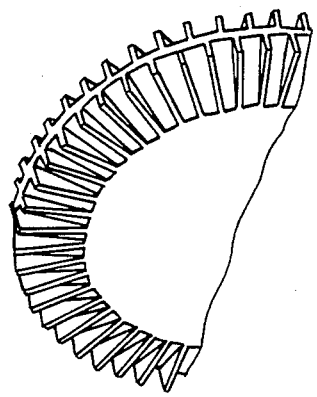

The fertilizer injection device illustrated in FIG. 8 is provided with a single-stage, double-sided pump impeller, its appearance being better discernable in FIG. 9. Herein the vanes 130 are provided on both sides of the rim 106 and extend to its periphery while being surrounded by a common channel 133 which extends around the periphery of the rim on three sides. The suction and discharge ports are located close to each other, similar to the arrangement shown in FIG. 5; the channel 133 is interrupted in the area between the two ports so as to create a narrow gap between impeller and housing. Two narrow gaps 132 serve to separate the pumping portion from the turbine portion; complete sealing of the two portions is obtained by means of two labyrinth seals 109 and 109'. This embodiment of a turbine pump is well known to the art; it is designed for a larger delivery than that obtainable by the device shown in FIG. 1, at lower pressure, however.

Although the device was essentially designed for automatic addition of fertilizer to irrigation water, it will be understood that it may likewise be used for injection of any other liquid into a pipe carrying a liquid other than water, as in the case of chemical or food industries. It is also applicabe to the addition of chemicals, at a very small rate, for the purification of water in domestic water supply systems.

It will be understood that the aforedescribed embodiments represent only examples of the many forms of the present device to be envisaged in accordance with the spirit of the present invention, and that modifications and variations may be carried out to the device by a person skilled in the art.

For instance, instead of the one or two sets of vanes and channels illustrated in the aforementioned devices, it is proposed to provide an impeller with two parallel rims with two sets of vanes each, wherein the appropriate channels could be connected in series with the object of obtaining a high pressure differential at relatively low speed. This arrangement is comparable with other multistage pumps known to the art. The device also lends itself to the provision of still more turbine pump sets, which may be in series or parallel arrangement in accordance with the required pressure and flow.

Production of the vanes may be by milling, as mentioned before, or by any other production process, such as moulding in metal or plastics, or by insertion of single blades into slots.

Figure 6:
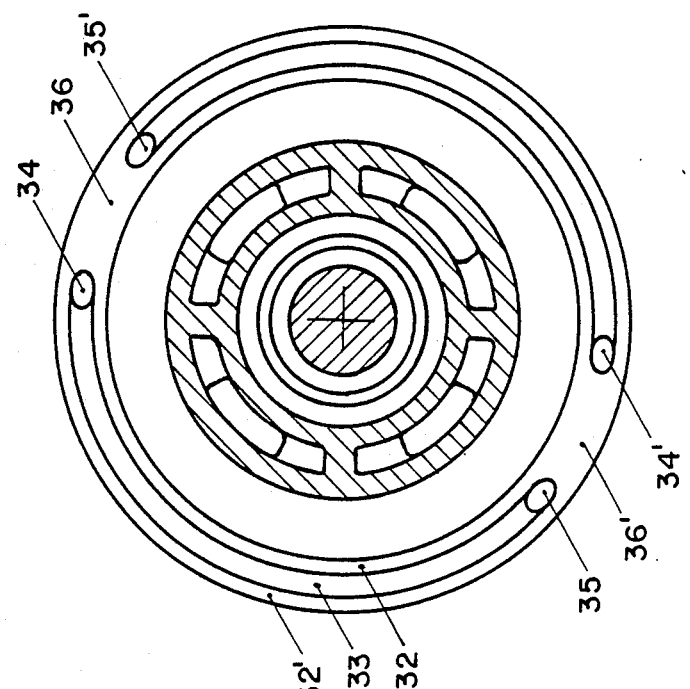
Figure 5:
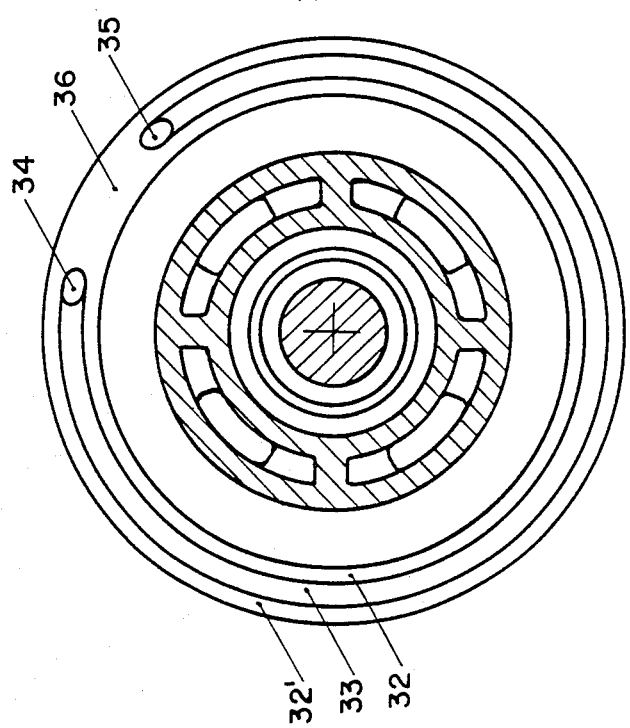

As shown in FIG. 6 the channel 33 may be split into two arms, each including suction and discharge ports, 34, 35 and 34', 35', respectively. This arrangement will result in reduced pressure at increased flow rate.

The pipe 18 and the opening 19 in the housing as illustrated in FIG. 1, may be replaced by a passage incorporated in the housing wall, or the liquid may be injected into any portion of the pipe or housing, either upstream or downstream of the impeller.

It should also be noted that any other control system than that illustrated in FIG. 10 may be employed to effect correct proportion of fertilizer or any other liquid to the water in the pipe line. It is, for instance, proposed to connect the respective static and total pressure ports 48 and 46 to electric sensors, and to feed their output in the form of electrical signals to a computer or microprocessor adapted to actuate the by-pass valve 44 in accordance with a prescribed feed program. As an additional check the output of the flowmeter 50 may also be fed to the computer means.

I claim:

1. An injection device adapted to be energized by the water flow in a pipe line III and to carry liquid fertilizer or other chemicals from a supply into said pipe line at a given rate and comprising a housing I adapted for positioning in said pipe line and containing an impeller II freely rotatable in axial alignment therewith, said device being characterized by a central turbine portion consisting of a number of turbine vanes (20) integral with said impeller and water guiding means (16) integral with said housing, and by a peripheral pump portion in the form of a side-channel turbine pump consisting of a plurality of spaced-apart, substantially radial vanes (30) provided on an annular portion on at least one side of an outstanding rim (6) extending from said turbine portion, and at least one stationary channel (33) recessed in said housing and facing said vanes in proximate relationship, said channel extending between a suction port (34) and a discharge port (35) provided in said housing.

2. The injection device of claim 1, wherein said impeller comprises a central hub (21) rotatable in bearings which are positioned in a central portion of said housing.

3. The injection device of claim 2, wherein said turbine vanes (20) in said impeller are bordered on their inside by said hub (21) and on their outside by a shroud (22), and wherein said rim (6) containing said pump portion is integral with said shroud and extends therefrom in outward direction.

4. The injection device of claim 1, wherein said housing is axisymmetrical and comprises a central tubular portion (12) provided at each end with connecting means (10) to said pipe line (III), and a peripheral portion (17) enclosing said pump portion of said impeller as well as said suction port and said discharge port.

5. The injection device of claim 4, wherein said housing is split into two halves along a central plane perpendicular to its axis, each said half being provided with a flange for connection of the two halves by connecting means (5) and sealing means.

6. The injection device of claim 5, wherein each half of said housing comprises a central guide body (13, 13') integral and coaxial with said tubular portion (12), of a largest diameter substantially equal to that of said hub and tapering from there towards the end of said half housing, said two guide bodies being, in assembled state of said housing, separated by a gap corresponding to the width of said hub and holding an axle (4) which extends across said gap in concentric alignment and supports said impeller hub (21) in bearing means (3).

7. The injection device of claim 1, wherein said side-channel turbine pump comprises two stages, in the form of one set of radial vanes (30, 30'') provided on each side of said rim (6), and of two channels (33', 33'') each facing one set of radial vanes, a first of said channels extending from said suction port (34) to a duct (36) communicating said channel to one end of the second channel, the other end of which communicates with said discharge port (55).

8. The injection device of claim 1, wherein said pump portion consists of a single-stage double-sided turbine pump, comprising radial vanes (130) provided on both sides of said rim and extending to the periphery of said rim (6), and a channel (133) extending between said suction port to said discharge port and surrounding said opposite vane portions along its sides and its periphery.

9. The injection device of claim 4, wherein said peripheral portion (17) of said housing encloses said pump portion of said impeller at a small clearance.

10. The injection device as claimed in claim 3, comprising sealing means (9) positioned between said shroud (22) and said housing, serving to prevent fluid communication between said pump portion and said turbine portion.

11. The injection device of claim 10, wherein said sealing means (9) are mechanical seals.

12. The injection device of claim 10, wherein said sealing means are labyrinth seals (109).

* * * * *

UNITED STATES PATENT AND TRADEMARK OFFICE
CERTIFICATE OF CORRECTION

PATENT NO. : 4,859,157
DATED : August 22, 1989
INVENTOR(S) : Dan ADLER

It is certified that error appears in the above-identified patent and that said Letters Patent is hereby corrected as shown below:

Column 7, line 31, replace "consisting of" with --comprising--.

Column 7, line 35, replace "consisting of" with --comprising--.

Signed and Sealed this

Twenty-sixth Day of June, 1990

Attest:

HARRY F. MANBECK, JR.

*Attesting Officer*         *Commissioner of Patents and Trademarks*